(12) United States Patent
Levy-Abegnoli et al.

(10) Patent No.: US 7,760,701 B2
(45) Date of Patent: Jul. 20, 2010

(54) ARRANGEMENT IN A ROUTER FOR DISTRIBUTING A ROUTING RULE USED TO GENERATE ROUTES BASED ON A PATTERN OF A RECEIVED PACKET

(75) Inventors: Eric M. Levy-Abegnoli, Valbonne (FR); Pascal Thubert, La Colle sur Loup (FR); Marco Molteni, Antibes (FR); Patrick Wetterwald, Cagnes sur Mer (FR); Massimo Villari, Messina (IT)

(73) Assignee: Cisco Technology, Inc., San Jose, CA (US)

( * ) Notice: Subject to any disclaimer, the term of this patent is extended or adjusted under 35 U.S.C. 154(b) by 2170 days.

(21) Appl. No.: 10/429,851

(22) Filed: May 6, 2003

(65) Prior Publication Data

US 2004/0223491 A1 Nov. 11, 2004

(51) Int. Cl.
*H04L 12/28* (2006.01)
(52) U.S. Cl. ...................... 370/351; 370/389
(58) Field of Classification Search .................. 370/351, 370/395.5, 395.31, 254, 400, 401, 389, 237, 370/238, 256, 352–356; 709/238, 239, 240, 709/241, 242, 243
See application file for complete search history.

(56) References Cited

U.S. PATENT DOCUMENTS

| | | | |
|---|---|---|---|
| 6,341,130 B1 | 1/2002 | Lakshman et al. | |
| 6,392,997 B1 * | 5/2002 | Chen | 370/252 |
| 6,845,091 B2 * | 1/2005 | Ogier et al. | 370/338 |
| 7,139,242 B2 * | 11/2006 | Bays | 370/238 |
| 2002/0069294 A1 | 6/2002 | Herkersdorf et al. | |
| 2002/0126337 A1 | 9/2002 | Uematsu et al. | |
| 2002/0141378 A1 | 10/2002 | Bays et al. | |
| 2002/0152209 A1 * | 10/2002 | Merugu et al. | 707/7 |
| 2002/0172203 A1 | 11/2002 | Ji et al. | |
| 2003/0031179 A1 | 2/2003 | Oh | |

(Continued)

FOREIGN PATENT DOCUMENTS

WO 03/079618 A2 9/2003

OTHER PUBLICATIONS

Bates et al., "Multiprotocol Extensions for BGP-4", Network Working Group, Request for Comments: 2283, Feb. 1998.

(Continued)

*Primary Examiner*—Donald L Mills
*Assistant Examiner*—Mon Cheri S Davenport
(74) *Attorney, Agent, or Firm*—Leon R. Turkevich

(57) ABSTRACT

A router is configured for sharing routing rules with other routers, the routing rules defining aggregated routes according to a prescribed topology. Each routing rule, used by the router for routing a packet having a corresponding matching destination address prefix, specifies a corresponding address prefix pattern rule for extracting an identified pattern from a portion of the destination address, and a gateway address pattern rule for generating a gateway address, for a gateway providing reachability to the destination address, based on applying the identified pattern to a specified portion of the gateway address. The router generates a routing update message that describes the address prefix pattern rule and the gateway address pattern rule, and outputs the routing update message to a second router according to a prescribed distance vector routing protocol (e.g., Multiprotocol Extension for Border Gateway Protocol).

27 Claims, 9 Drawing Sheets

U.S. PATENT DOCUMENTS

2004/0088389 A1* 5/2004 Shah .......................... 709/221
2004/0196854 A1* 10/2004 Thubert et al. ......... 370/395.31

OTHER PUBLICATIONS

Hinden et al., "IP Version 6 Addressing Architecture", Network Working Group, Request for Comments: 2373, Jul. 1998.

Altman et al., "Telnet Kermit Option", Network Working Group, Request for Comments: 2840, May 2000.

Bates et al., "Multiprotocol Extensions for BGP-4", Network Working Group, Request for Comments: 2858, Jun. 2000.

Johnson et al., "Mobility Support in IPv6", IETF Mobile IP Working Group, Internet Draft, draft-ietf-mobileip-ipv6-20.txt, Jan. 20, 2003.

Rekhter et al., "A Border Gateway Protocol 4 (BGP-4)", Network Working Group, Request for Comments: 1771, Mar. 1995, pp. 1-57.

Cisco Internetworking Technologies Handbook, Chapter 39, "Border Gateway Protocol", Cisco Press [online], 2004 [retrieved on April 14, 2009]. Retrieved from the Internet: <URL: http://www.cisco.com/en/US/docs/internetworking/technology/handbook/bgp.pdf>, p. 39-1 to p. 39-10.

* cited by examiner

ARRANGEMENT IN A ROUTER FOR DISTRIBUTING A ROUTING RULE USED TO GENERATE ROUTES BASED ON A PATTERN OF A RECEIVED PACKET

BACKGROUND OF THE INVENTION

1. Field of the Invention

The present invention relates to distribution of routing information by an Internet Protocol (IP) based router that enables aggregation of routes in another IP router.

2. Description of the Related Art

Routing protocols are used to exchange routing information between networks, allowing routing tables to be built dynamically. Traditional Internet Protocol (IP) based routing uses next-hop routing, where a router only needs to consider where it sends the packet, and does not need to consider the subsequent path of the packet on the remaining hops. This form of dynamic routing provides substantial flexibility in the Internet, and has enabled the Internet to grow in size by more than eight orders of magnitude over the last thirty years.

Routing algorithms use two basic technologies: link-state routing protocols and distance-vector routing protocols. Link-state routing protocols enable a router to inform other routers of its "neighbors" (i.e., adjacent routers). Distance-vector routing protocols enable a router to describe the network topology to its "neighbors".

Efforts are underway to improve the flexibility and performance of the Internet based on enhancing operations in the routers used to route data traffic. For example, proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has two working groups focusing on mobile networks, a Mobile Ad-hoc Networks (MANET) Working Group that is working to develop standardized MANET routing specification(s) for adoption by the IETF, and NEMO (mobile networks). NEMO uses Mobile IP (MIP) to provide connectivity between mobile networks and the infrastructure (e.g., the Internet). The key component in NEMO is a mobile router that handles MIP on behalf of the mobile networks that it serves.

According to the MANET Working Group, the "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

A "Mobile IPv6" protocol is disclosed in an Internet Draft by Johnson et al., entitled "Mobility Support in IPv6", available on the World Wide Web at the address: http://www.ietf.org/internet-drafts/draft-ietf-mobileip-ipv6-20.txt (the disclosure of which is incorporated in its entirety herein by reference). According to Johnson et al., the Mobile IPv6 protocol enables a mobile node to move from one link to another without changing the mobile node's IP address. In particular, the mobile node is assigned a "home address". The "home address" is an IP address assigned to the mobile node within its home subnet prefix on its home link. While a mobile node is at home, packets addressed to its home address are routed to the mobile node's home link, using conventional Internet routing mechanisms.

The mobile node also is assigned a home agent for registering any care-of address used by the mobile node at its point of attachment to the Internet while the mobile node is away from its home link. A care-of address is an IP address associated with a mobile node that has the subnet prefix of a particular link away from its home link (i.e., a foreign link). A home agent is a router on a mobile node's home link with which the mobile node has registered its current care-of address. While the mobile node is away from its home link, the home agent intercepts packets on the home link destined to the mobile node's home address; the home agent encapsulates the packets, and tunnels the packets to the mobile node's registered care-of address.

Hence, a mobile node is always addressable by its "home address": packets may be routed to the mobile node using this address regardless of the mobile node's current point of attachment to the Internet. The mobile node also may continue to communicate with other nodes (stationary or mobile) after moving to a new link. The movement of a mobile node away from its home link is thus transparent to transport and higher-layer protocols and applications.

A particular problem of network mobility is that conventional aggregation of routes is not feasible for mobile routers. In particular, routers in a conventional Internet-based network topology are configured for aggregating routes based on groupings of subnets according to a hierarchy of common addresses. For example, a top-level router (e.g., a primary router of an organization configured as an entry point to the organization for all Internet traffic) advertises to other routers in the Internet that all packets having a destination address top level prefix (e.g., 127/8 for IPv4) should be sent to that top-level router.

The top-level router includes a routing table that includes including routing entries. Each routing entry includes a corresponding prefix key and a next hop field. The prefix key is used to match the destination address of an incoming packet (typically applying a net mask to the destination address); hence, the router identifies the entry having the corresponding prefix key that matches the masked destination address, and routes the packet to the router specified in the corresponding next hop field. Hence, a single router may aggregate multiple routes for reaching routers configured for serving the subnets having subnet address prefix values within the aggregated value of 127/8 (e.g., 127.192/10, 127.192/10, 127.192/10, and 127.192/10, etc.). Each subnet typically will include additional routers configured for routing packets within the corresponding prescribed address space.

In the case of mobile networking, however, aggregation is not possible using conventional aggregation techniques, since all the mobile routers present to the home agent a flat topology that is not suitable for aggregation. Hence, the home agent would require a routing table entry for each mobile prefix via a mobile router that serves as a point of attachment for a corresponding mobile network.

SUMMARY OF THE INVENTION

There is a need for an arrangement that enables a router to generate a routing table capable of aggregation of routes to mobile routers for respective mobile networks.

There also is a need for an arrangement that enables an Internet Protocol (IP) router to establish a generic representation of multiple routes to reduce routing table size. Further, there is a need for an arrangement that enables the IP router to distribute that generic representation to other routers in order to deploy route optimization between the multiple routes.

There also is a need for an arrangement that enables a router to obtain scalable routing information for multiple routes to multiple destination networks, without the necessity for transfer of substantial routing information between routers.

These and other needs are attained by the present invention, where a router is configured for sharing routing rules with other routers, the routing rules defining aggregated routes according to a prescribed topology. Each routing rule, used by the router for routing a packet having a corresponding matching destination address prefix, specifies a corresponding address prefix pattern rule for extracting an identified pattern from a portion of the destination address, and a gateway address pattern rule for generating a gateway address, for a gateway providing reachability to the destination address, based on applying the identified pattern to a specified portion of the gateway address. The router generates a routing update message that describes the address prefix pattern rule and the gateway address pattern rule, and outputs the routing update message to a second router according to a prescribed routing protocol. Hence, the second router can route a packet according to the prescribed topology used by the routing rule.

One aspect of the present invention provides a method in an Internet Protocol (IP) based router. The method includes storing a routing rule that defines routes aggregated according to a prescribed topology. The routing rule specifies an address prefix pattern rule for extracting an identified pattern from a first portion of a destination address, and a gateway address pattern rule for generating a gateway address based on applying the identified pattern to a specified second portion of the gateway address. The gateway address specifies a gateway providing reachability to the destination address. The method also includes generating a routing update message that describes the address prefix pattern rule and the gateway address pattern rule, outputting the routing update message to a second router according to a prescribed routing protocol. The second router is able to use the routing update message in routing a corresponding received packet according to the prescribed topology.

Another aspect of the present invention provides an Internet Protocol (IP) based router. The router includes a table, a routing protocol resource, and an IP interface. The table is configured for storing a routing rule that defines routes aggregated according to a prescribed topology. The routing rule specifies an address prefix pattern rule for extracting an identified pattern from a first portion of a destination address, and a gateway address pattern rule for generating a gateway address, specifying a gateway providing reachability to the destination address, based on applying the identified pattern to a specified second portion of the gateway address. The routing protocol resource is configured generating a routing update message, that describes the address prefix pattern rule and the gateway address pattern rule, for use by a second router in routing a corresponding received packet according to the prescribed topology. The IP interface is configured for outputting the routing update message to the second router according to a prescribed routing protocol.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to a router configured for distributing routing update messages that specify routing rules for generating pattern-based automatic routes, enabling different routers within a wide area network to share routing rules for aggregation of routes within the respective routers.

In particular, commonly-assigned, application Ser. No. 10/404,064, filed Apr. 2, 2003, entitled ARRANGEMENT IN A ROUTER FOR GENERATING A ROUTE BASED ON A PATTERN OF A RECEIVED PACKET, issued as U.S. Pat. No. 6,917,618, the disclosure of which is incorporated in its entirety herein by reference, discloses an arrangement for determining a gateway address for a gateway router (i.e., a "via" router), within the path to the destination node, based on calculating the gateway address according to prescribed functions. In particular, the router is configured for determining a "via" router (e.g., the IPv6 mobile router) for a received packet based on accessing a routing table having multiple routing entries: each routing entry includes a routing key and a routing field that specifies either a prescribed address specifying the via router or a computation tag, also referred to herein as a routing rule. The via router is a router within the path to a destination node, and will be able to route the packet along the path. The computation tag (i.e., routing rule) specifies a prescribed function to be executed to calculate a determined address for the via router. The router identifies, for each received packet, the matching routing entry based on the corresponding routing key, and in response to detecting the computation tag in the routing field, selectively executes the corresponding function to calculate the determined address for the via router.

According to the disclosed embodiment, the attributes associated with the above-described computation tag (i.e., routing rule) are distributed to other routers using a prescribed distance vector routing protocol, enabling other routers to use the routing rule for their own routing operations. As described below with respect to FIG. 4, the distribution of routing rules enables other routers to automatically establish optimized routes between subnetworks in a scaleable manner, where the optimized routes between subnetworks can be established using a single routing rule.

A description will be provided of the routing operations based on generation of pattern-based automatic routes using the routing rules, as well as the arrangement for distributing the routing rules to other routers. A description also will be provided of how a router, having received the routing rule, can implement the rule to provide route optimization in a scaleable manner.

Figure 1:
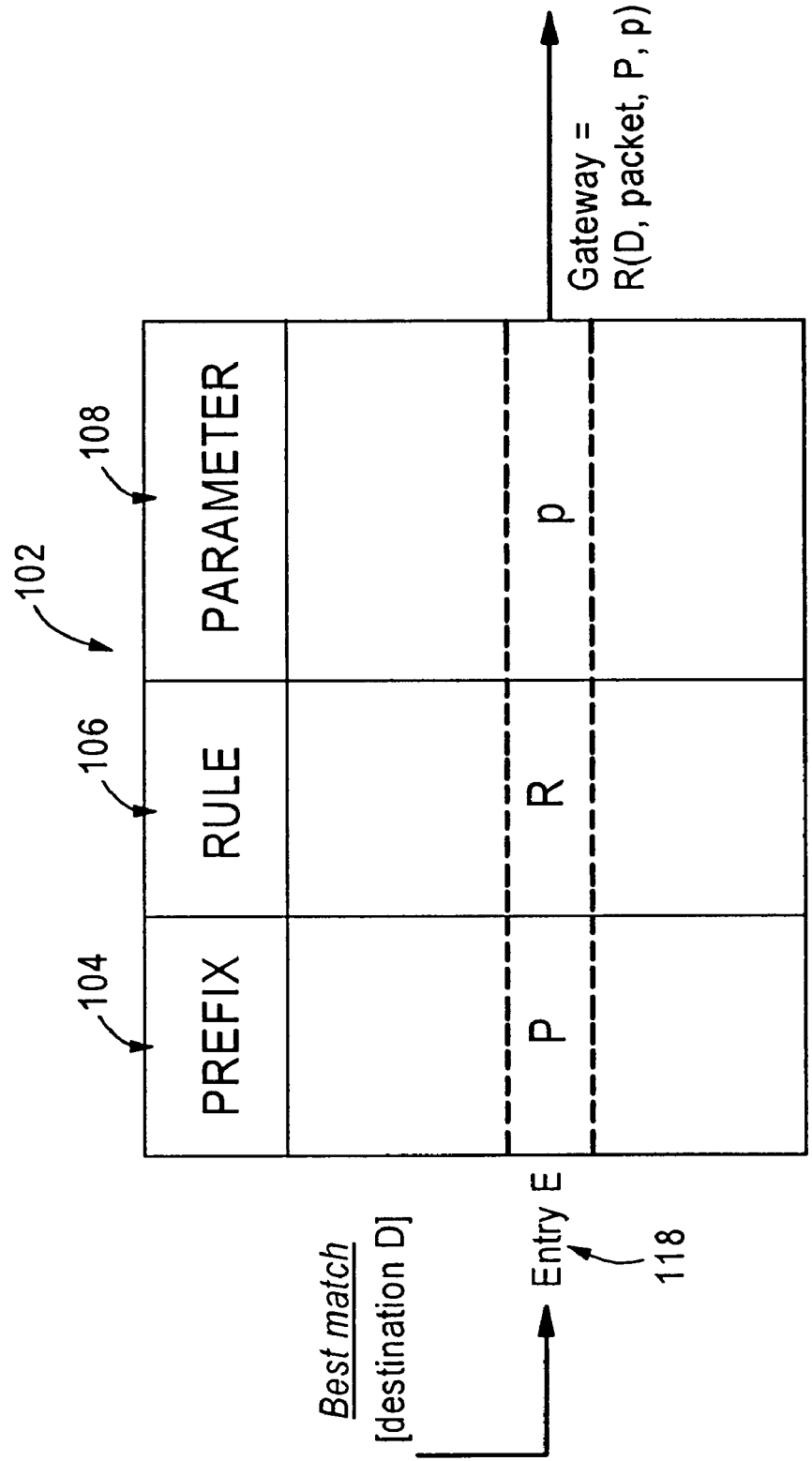
FIG. 1 is a diagram illustrating a routing table configured for generating pattern-based automatic routes, according to an embodiment of the present invention.

FIG. 1 is a diagram illustrating a routing table 102 configured for generating pattern-based automatic routes using routing rules, according to an embodiment of the present invention. The routing table 102 includes a prefix field 104 that specifies a prefix key P, also referred to as a routing key, a routing field 106 that specifies a rule (e.g., a prescribed function) R, and a parameter field 108 that specifies parameters (p) for execution of the rule R according to the function R(D, packet, P, p). As described below, the next hop gateway address is obtained by execution of the function R(D, packet, P, p). For the purposes of later describing the distribution of the "routing rule" to other routers, the "routing rule" includes information from the routing field 106 and the parameter field 108.

Figure 2:
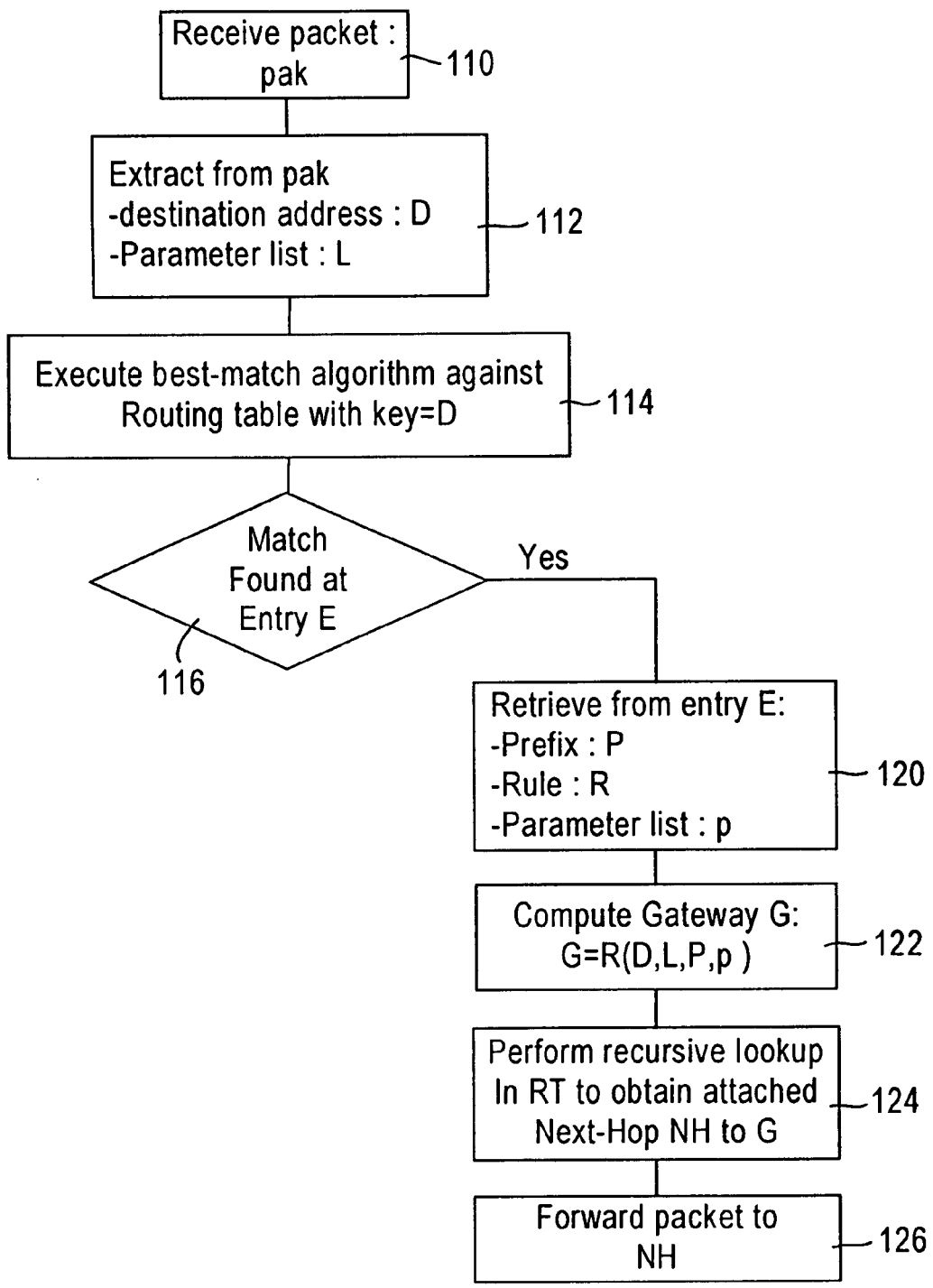
FIG. 2 is a diagram illustrating the method of generating a route based on the route table entry of FIG. 1.

FIG. 2 is a diagram illustrating the method of generating a route based on the route table entry of FIG. 1. In response to receiving a packet in step 110, a router having the routing table 102 extracts in step 112 from the received packet the destination address D, and a prescribed parameter list L (e.g., explicit header values specified in the received packet). The router executes in step 114 a best-match algorithm search against the routing table 102, using the destination address D as a key, in order to locate in step 116 a matching entry (Entry "E") 118.

Assuming the matching entry 118 is located in step 116, the router retrieves in step 120 the corresponding prefix P from the prefix field 104, the corresponding rule R from the routing field 106, and the corresponding parameter list p from the parameters field 108. The router computes in step 122 the gateway address G based on executing the function R based on the destination address D, the parameters P from the received packet, the matching address prefix P from the prefix field 104, and/or the corresponding stored parameters p from the parameter field 108. If the gateway address is for a gateway that is not connected to the router, the router performs in step 124 a recursive lookup in the routing table 102 (e.g., repeat steps 114 through 122 using the gateway address) to obtain the next hop router to reach the gateway. The packet is then forwarded to the next hop router (NH) in step 126.

Hence, router entries can be simplified based on storing routing rules specifying prescribed functions for calculating the destination address. Moreover, these route entries are distributed among different routers according to a prescribed routing protocol, enabling the routers to route received packets based on calculating the destination address.

Figure 3:
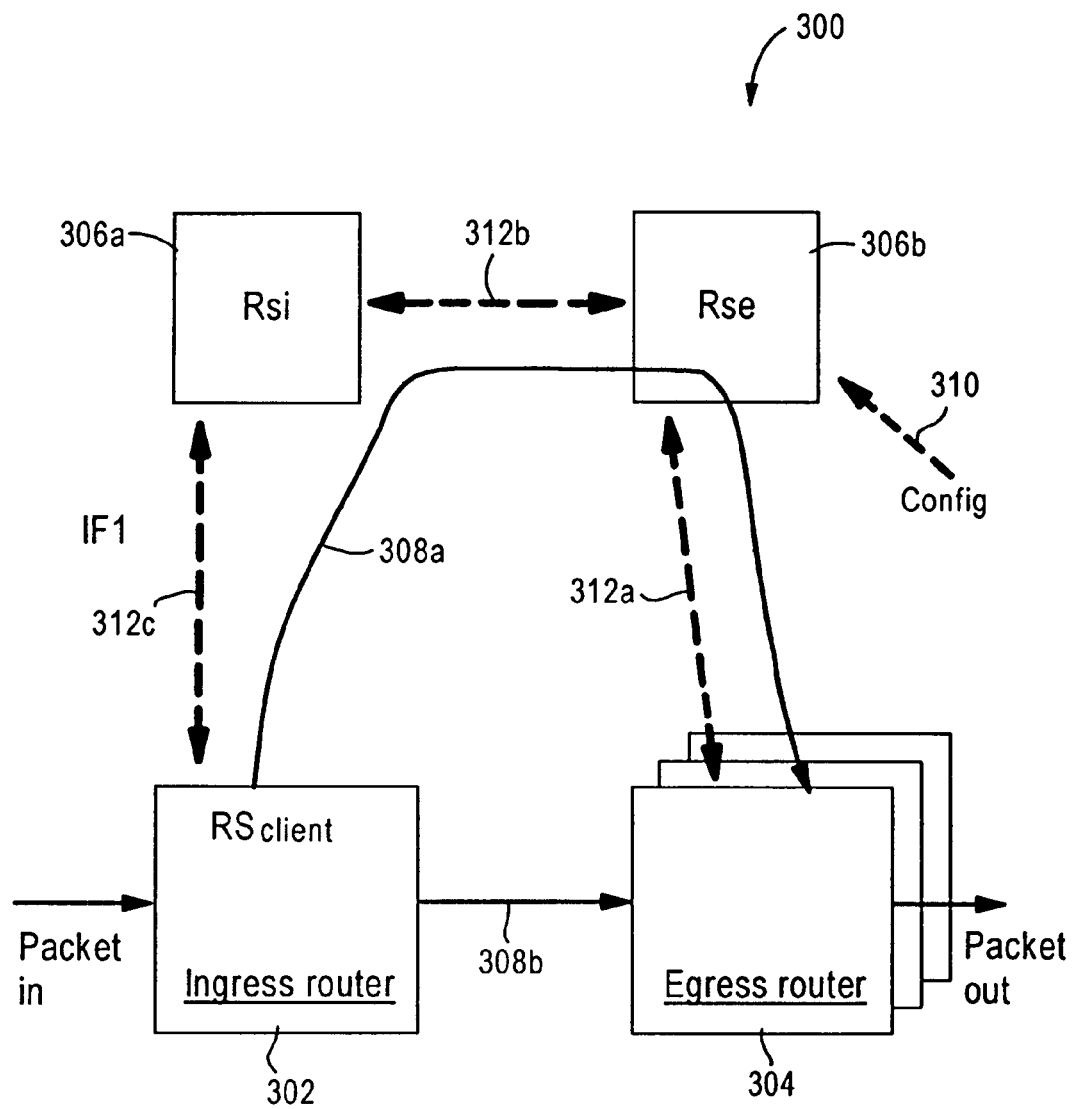
FIG. 3 is a diagram illustrating the transfer of pattern-based automatic routes between route servers and route-server clients, according to an embodiment of the present invention.

FIG. 3 is a diagram illustrating the distribution of routing rules among different network nodes, according to an embodiment of the present invention. The network 300 includes an ingress router 302 that receives a packet for transfer, an egress router 304 that serves as a via router for the received packet, and route servers 306a and 306b. The route servers 306a and 306b may be implemented as routers that also perform routing of packets.

As illustrated in FIG. 3, there are two possible paths for the ingress router 302 to route the received packet to the egress router 304: either via path 308a by using the route servers 306a and 306b as next hop routers, or directly via path 308b. According to the disclosed embodiment, the ingress router 302 is configured for receiving routing information from the route server 306a, for routing the packet directly via the path 308b. In particular, the ingress route server 306a receives routing rules from the egress route server 306b, enabling the ingress route server 306a to generate routing information for use by the ingress router 302. The egress route server 306b may be configured by an external source 310 with the routing rule, or may receive either the routing rule or other routing information from the egress router 304 using a prescribed routing protocol 312a.

The egress route server 306b distributes the routing rule using a prescribed routing protocol 312b to the ingress route server 306a. The egress route server 306b may distribute the routing rule in response to a request from the ingress route server 306a (described below), or in response to detecting a threshold amount of traffic along the path 308a.

The ingress route server 306a, in response to receiving the routing rule from the egress route server 306b according to the routing protocol 312b, can then instantiate (i.e., generate, calculate) a complete route that explicitly specifies an IP address for reaching the egress router 304 via the path 308b. In particular, the ingress route server 306a may instantiate the complete route and supply the ingress router 302 with the complete route in response to a request from the ingress router 302 for an optimum route (based on the ingress router 302 detecting that the traffic is reaching a prescribed threshold). The ingress route server 306a or egress route server 306b also may instantiate the complete route based on its own corresponding detection that the traffic along path 308a is exceeding a prescribed threshold, in which case the complete route would be supplied to the ingress router according to a routing protocol 312c to direct the ingress router 302 to use the path 308b.

Hence, the supply of routing information may occur automatically by the egress route server 306b "pushing" the routing rule to the ingress route server 306a in response to detecting that traffic along the path 308a exceeds a prescribed threshold; the ingress route server 306a can then generate the complete routing information for the ingress router 302 to route packets via the path 308b. Alternately, the ingress route server 306a may instantiate the routing information in response to a request from the ingress router 302. In either case, the routing rules are distributed between the route servers 306, which instantiate complete routes for routing packets.

As described below, the disclosed arrangement for calculating the destination address using a rule specified in the routing table is particularly beneficial for mobile IP.

Figure 4:
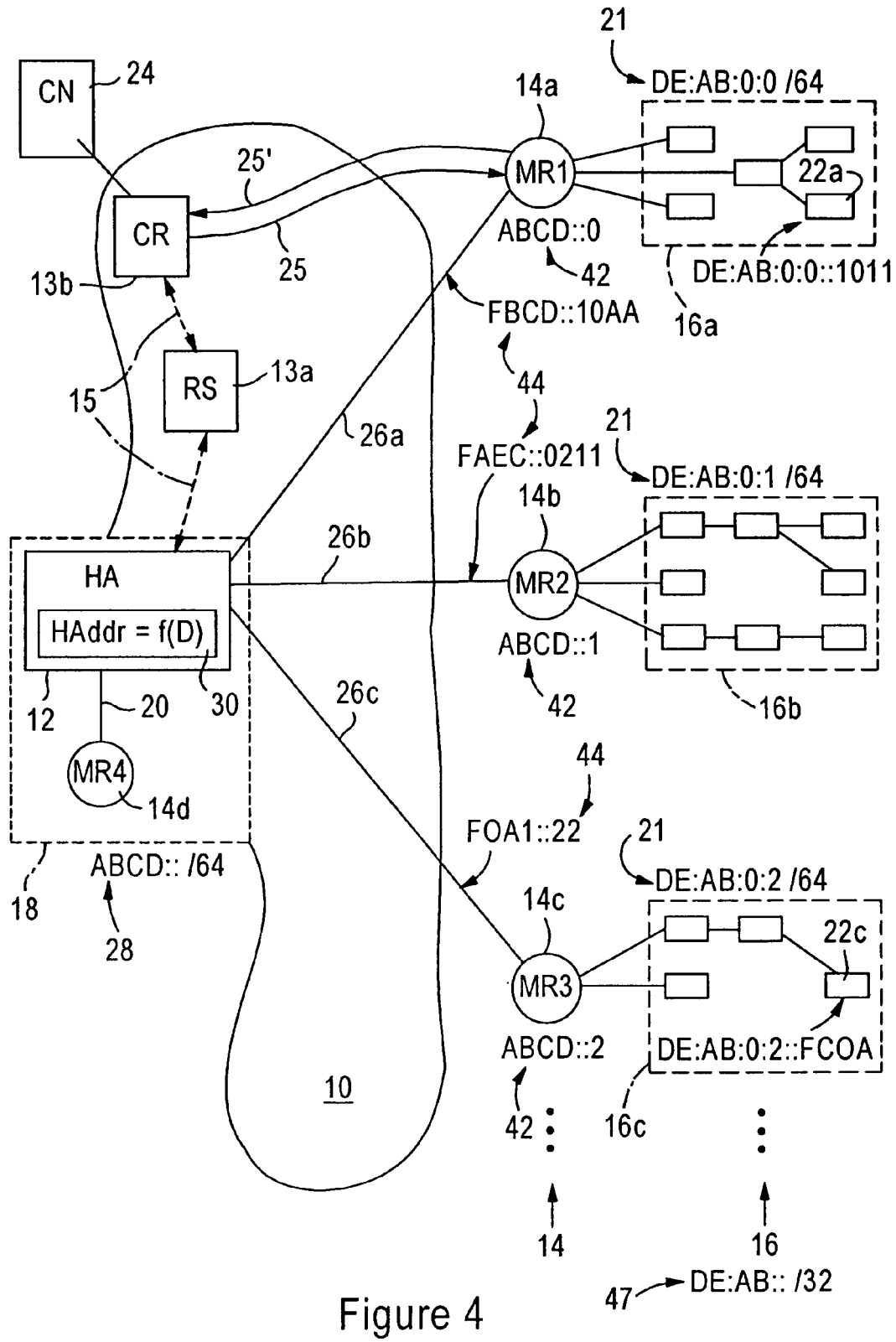
FIG. 4 is a diagram illustrating deployment of the route servers and route server-clients of FIG. 3 in a wide area network, including a mobile networks having respective mobile routers in communication with a prescribed home agent within, wherein the home agent includes a routing table for pattern-based automatic routes according to an embodiment of the present invention.

FIG. 4 is a diagram illustrating a wide area network 10 having a router 12 configured for using a routing rule for calculating a determined address for routing of a received packet to a via router (e.g., 14a 14b, 14c, etc.), and distributing that routing rule for use by other routers (e.g., 13a, 13b) according to an embodiment of the present invention. As illustrated in FIG. 4, the router 12 is implemented as a home agent (HA) and the via routers 14a, 14b, and 14c are implemented as mobile routers serving as attachment points to the wide area network 10 for respective mobile networks 16a, 16b, and 16c, in accordance with the above-incorporated Internet Draft by Johnson et al. Also note that the mobile router 14d is currently at its home network 18, where the mobile router 14d has a home link 20 within the home network 18 to the home agent 12.

The routers 13a and 13b also are configured as peer routers capable of exchanging routing information 15 between each other and the router 12 by specifying a new address family according to Multiprotocol Extension for Border Gateway Protocol (MP-BGP) as specified by the IETF Request for Comments (RFC) 2283, 2842, and 2858, incorporated in their entirety herein by reference.

As illustrated in FIG. 4, the home network 18 has an IPv6 home subnet prefix value 28 of "ABCD::/64", using the address notation specified by the IETF Request for Comments (RFC) 2373, incorporated in its entirety herein by reference. In particular, a 128-bit IPv6 address is represented as having eight (8) sixteen bit portions separated by a ":" symbol; hence, the 128-bit address value "1080:0:0:0:0:0:0: 417A" specifies an address where the first sixteen bits are "1080" (hexadecimal), and the last sixteen bits are "417A". In accordance with RFC 2373, this address value can be truncated to "1080::417A" using a double-colon symbol "::", indicating that all bits between the specified values are all zero's.

As illustrated in FIG. 4, the mobile networks 16a, 16b, and 16c have address prefix values 21 of DE:AB:0:0/64, DE:AB: 0:1/64, and DE:AB:0:2/64, respectively. The respective attachment routers 14a, 14b, and 14c providing an attachment point for the mobile networks 16a, 16b, and 16c have home address values 42 of ABCD::0, ABCD::1, and ABCD::2, respectively. Further, the care of addresses 44 for the mobile routers 14a, 14b and 14c are FBCD::10AA, FAEC::0211, and F0A1::22, respectively.

Existing approaches for routing packets between a mobile host (e.g., 22a, 22c) and a correspondent node (CN) 24 involve the corresponding mobile router (e.g., 14a, 14c) sending the packets via a home agent home agent 12 through a corresponding bidirectional tunnel (e.g., 26a, 26c). The home agent 12, upon receiving the packets via the tunnel (e.g., 26a, 26c), routes the packet to an Internet router identified by existing routing protocols to provide reachability for the correspondent node 24. The correspondent router (CR) 13b, which provides reachability for the correspondent node 24: if the existing routing protocols identify the CR 13b, the packet will be routed to the CR 13b; however, if the existing routing protocols do not identify the CR 13b, the packet may be routed to the CN 24 via another router providing reachability to the CN 24 for incoming packets. The correspondent node sends a reply to the mobile host 22 by outputting a packet that specifies in its destination address field the address of the mobile host 22 (e.g., "DE:AB:0:2::FC0A"). The home agent 12 also has sent router advertisement messages to routers in the Internet 10 specifying that the home network 18 (i.e., the network having the home subnet prefix ABCD::/64) is configured for routing packets having the destination network prefix "DE:AB::/32", where the first 32 bits of the 128 bit address equal "DE:AB". Hence, the correspondent router 13b will route the packet from the CN 24 and destined for the mobile node 22 to the home agent 12.

However, aggregation is not possible using conventional aggregation techniques, since all the mobile routers 14 present to the home agent 12 a flat topology that is not suitable for aggregation. Hence, the home agent 12 would normally require a routing table entry for each mobile prefix 21 via the mobile router 25 that serves as a point of attachment for a corresponding mobile network. Consequently, conventional routing tables can quickly become overwhelmed by a large number of mobile networks, for example installation of a mobile network in each vehicle manufactured by a vehicle manufacturer, resulting in millions of mobile subnets generated per year.

According to the disclosed embodiment, the home agent 12 includes a routing module 30 configured for calculating a determined address for a via router, based on executing a prescribed function f(D) (i.e., routing rule) specified within a matching routing table entry. As described below, the routing rule is used to characterize the mapping between the mobile routers 14 and their respective mobile networks 16, enabling the routing information for all the mobile networks 16 to the specified by a single routing entry.

In addition, the routing rule f(D) can be distributed to other routers 13a, 13b, to provide route optimization. In particular, the home agent 12 may send the routing rule f(D) to a route server 13a according to a prescribed routing protocol 15. The route server is a device (e.g., another router) with which the home agent 12 has a prescribed security relationship (i.e., a trusted relationship that verifies authenticity of any shared information). Hence, any other device (e.g., another distributed route server, a recognized router 13b) that has a security relationship with the route server 13a can share information with the route server 13a in a trusted manner. Consequently, the correspondent router 13b can obtain the routing rule f(D) from the route server 13a in order to establish an optimized route 25 with a mobile router 14a, based on mapping the determined home address 42 of the mobile router 14a (determined by the routing rule f(D)) with the corresponding care-of address 44 (specified within a binding cache entry in the correspondent router 13b): the correspondent router 13b can then use that optimized route 25 to reach a mobile host 22a in the corresponding mobile network 16a, bypassing the home agent 12. Additional details related to establishing an optimized route between the correspondent router 13b and a mobile router 14a serving a corresponding mobile network 16a are described in commonly-assigned, copending application Ser. No. 10/361,512, filed Feb. 11, 2003, entitled ARRANGEMENT FOR ESTABLISHING A BIDIRECTIONAL TUNNEL BETWEEN A MOBILE ROUTER AND A CORRESPONDENT NODE, the disclosure of which is incorporated in its entirety herein by reference.

Moreover, the routing rule f(D) supplied to the correspondent router 13b defines the routes to all mobile networks 16 via their respective mobile routers 14. Hence, the correspondent router 13b can use the single routing rule f(D) for reaching any one of the mobile networks 16 via its corresponding mobile router 14. Hence, the correspondent router 13b can use the same routing rule to send a packet to the mobile host 22a of mobile network 16a, or the mobile host 22c of mobile network 16c.

Hence, in the example of FIG. 4: the correspondent router 13b is equivalent to the ingress router 302 of FIG. 3 and the mobile router 14a terminating the path 25 is equivalent to the egress router 304 of FIG. 3 terminating the path 308b; the home agent 12 serves as the egress route server 306b of FIG. 3, and the route server 13a of FIG. 4 serves as the ingress route server 306a of FIG. 3. In contrast, the mobile router 14a can serve as an ingress router 302 and the correspondent router 13b as the egress router 304 during establishment of a reverse path 25' opposite to the direction of the path 25, in which case the mobile router 14a may obtain the routing rules associated with reaching the correspondent node 24 from the route server 13a which serves as the ingress route server 306a. Additional details regarding establishing the paths 25 and 25' are disclosed in the above-incorporated application Ser. No. 10/361,512.

Figure 5:
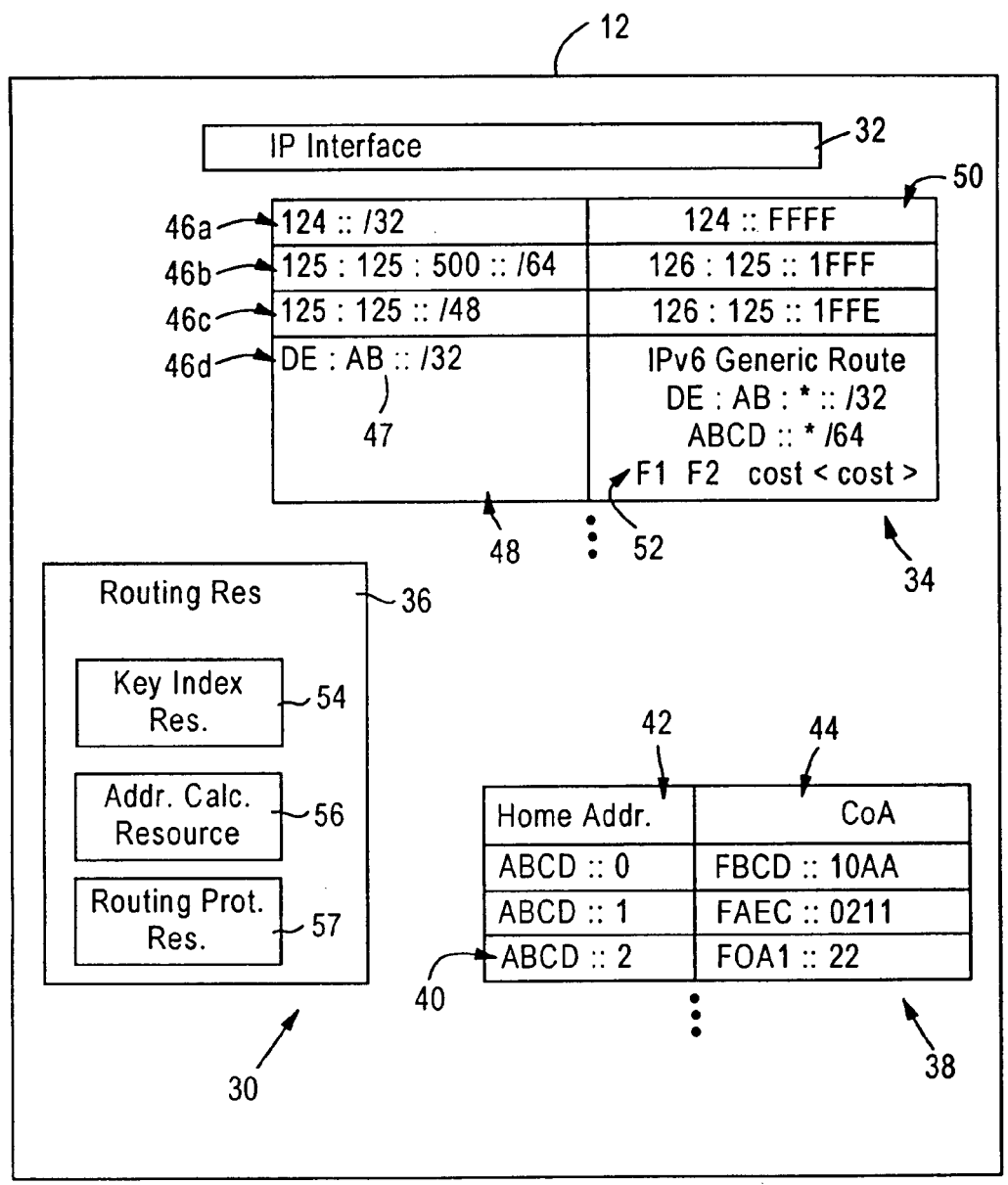
FIG. 5 is a diagram illustrating in detail the home agent of FIG. 4.

FIG. 5 is a diagram illustrating in detail the router 12, according to an embodiment of the present invention. The description of the router 12 in FIG. 5 is applicable to the route server 13a and the correspondent router 13b, and all the nodes of FIG. 3.

The router 12 includes an Internet protocol interface 32 and the routing module 30. The IP interface 32 is configured for sending and receiving data packets, and sending and receiving reachable route messages specifying routing rules, according to a distance-vector routing protocol 15 such as MP-BGP. The routing module 30 includes a routing table 34, and a routing resource 36. In the case where the router 12 is implemented as a home agent for the mobile routers 14, or in the case of the correspondent router 13b configured for communicating with the mobile routers 14, the routing module 30 also includes a binding cache 38 that includes binding cache entries 40 that specify a home address 42 and a care of address 44.

The routing table 34 includes multiple routing entries (e.g., 46a, 46b, 46c, and 46d), each specifying a corresponding routing key 48 and a routing field 50. Each routing key 48 specifies a corresponding IP subnet prefix, depending on existing network topology and aggregation characteristics. For example, the routing keys 48 for the routing entries 46a, 46b, and 46c specify address prefix values "124::/32", "125:125:500::/64", and "125:125::/48" for respective subnets (not shown) having the associated prefix values. As illustrated in FIG. 5, the routing fields 50 for the routing entries 46a, 46b and 46c specify explicit addresses for next-hop routers connected to the router 12.

The routing table 34 also includes a routing entry 46d having a routing key 48 that specifies the address prefix 47 of the aggregated mobile networks 16 (e.g., "DE:AB::/32"); in other words, the mobile networks 16 share the address prefix used as the routing key 46d. The routing entry 46d also includes a routing field 50 that specifies a computation tag 52. The computation tag 52 specifies that at least one function (F) (i.e., routing rule) is to be executed in order to calculate with a determined address for the via router. As illustrated in FIG. 5, the computation tag 52 has the form:

<Address Type><First Input Variable><Second Input Variable><Function Call><Cost Dec>.

The <Address Type> parameter specifies that the field includes an extended entry, in this case for calculating an IPv6 generic route using the supplied parameters. The input variables ("DE:AB:*::/32" and "ABCD::*/64) specify the variables to be used during execution of the function calls of the specified functions "F1" and "F2", subject to prescribed cost limitations specified in the cost declaration. As illustrated below with respect to FIG. 6, the character "*" represents a variable to be extracted/inserted in the parameter, depending on the specified function. The computation tag 52 it is illustrated solely as an exemplary illustration of specifying parameters and functions within the routing field 50.

As illustrated in FIG. 5, the routing resource 36 includes a key index resource 54, an address calculation resource 56, and a routing protocol resource 57. The key index resource 54 is configured for identifying a matching routing entry from the routing table 34 for a received IP data packet based on detecting a match between the destination address and the corresponding routing key 48. As described below, the address calculation resource 56 is configured for calculating the address to be used for forwarding the data packet to a via router; in the case of the router 12 being implemented as a home agent, the address calculation resource 56 is configured for calculating the home address of the mobile router 14 serving the destination host 22. The routing protocol resource 57 is configured for generating a routing update message, that describes the routing rule 52, and sending the routing update message to other routers sharing the same address family according to MP-BGP protocol.

Figure 6:
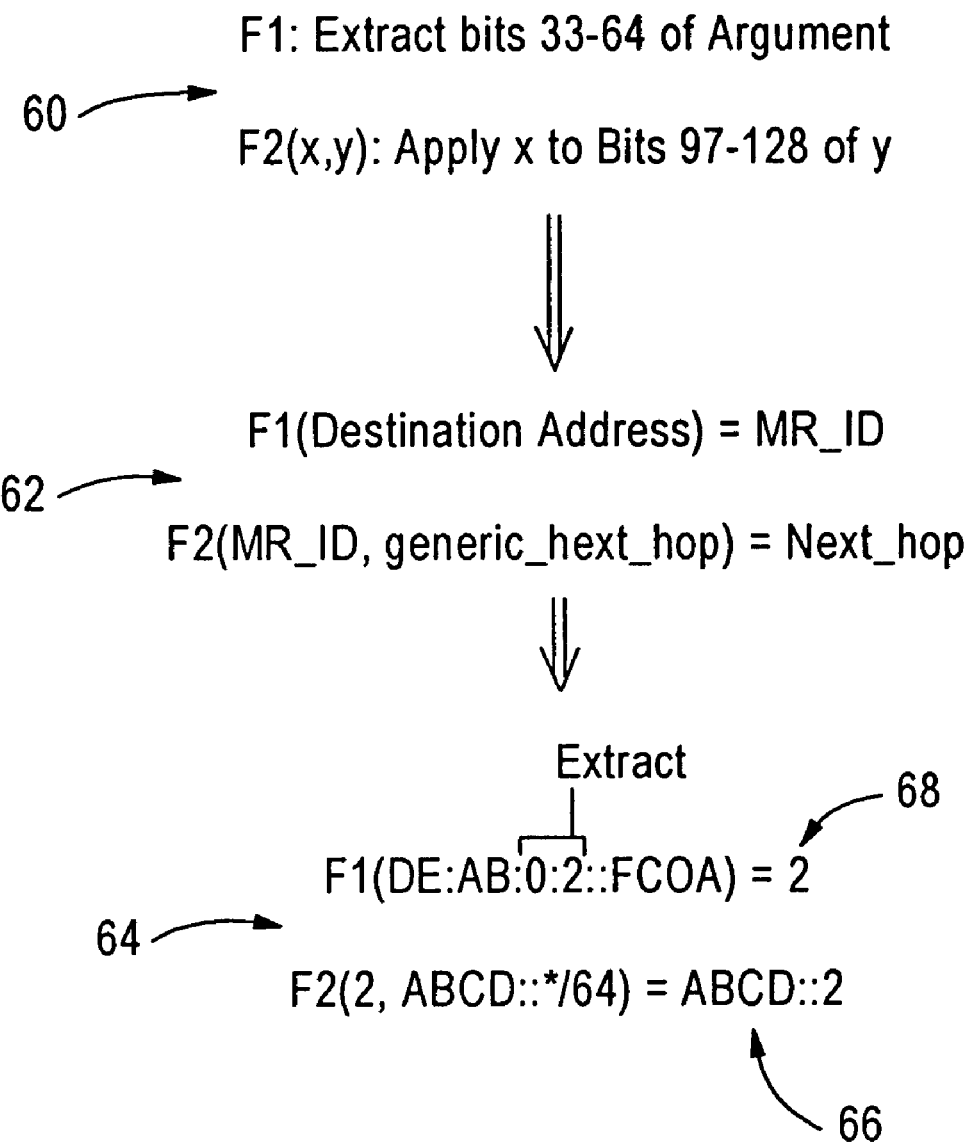
FIG. 6 is a diagram illustrating an exemplary function from the routing field of FIG. 5, used to calculate the home address of the via router of FIG. 4.

FIG. 6 is a diagram illustrating execution of the functions specified in the routing entry 46d by the address calculation resource 56. In particular, the routing resource 36 issues a function call to the address calculation resource 56 in response to detecting the computation tag 52 in the routing field 50 of the matching routing entry (e.g., 46d). The address calculation resource 56 parses the computation tag 52, and executes the prescribed functions specified in the computation tag 52.

As illustrated in FIG. 6, the address calculation resource 56 includes context definition information 60 within its application runtime environment that defines the functions F1 and F2: as illustrated in FIG. 6, the context definition information 60 specifies that the function F1 extracts prescribed bits of the supplied destination address, in this case the bits 33-64 of the argument; the context definition information 60 also specifies that the function F2 applies the first argument (x) to bits 97-128 of the second argument (y). In the context of mobile computing, the context definition information 60 is applied to provide the functional operations 62, where the function F1 (destination address) is used to determine the mobile router identifier (MR_ID); the mobile router identifier is then used as an argument for the second function F2 (MR_ID, generic_next_hop) to determine the next hop address (e.g., the home address).

Actual execution 64 of the computation tag 52 by the address calculation resource 56 results in the calculated address 66 based on determining the mobile router identifier 68. In particular, the address calculation resource 56 extracts bits 33-64 of the destination address "DE:AB:0:2::FC0A" to obtain the mobile router identifier ("MR_ID=0:2") 68. Note that the bits 33-64 are within the 64-bit address prefix range of the home subnet prefix 28. The address calculation resource 56 then executes the function F2 by replacing the variable "*" of the prescribed address prefix (e.g., the home subnet prefix "ABCD::*/64") 28 with a mobile router identifier 68 ("0:2"), resulting in the determined home address "ABCD::2" 66 of the mobile router 14c serving as the attachment router for the destination host 22.

Figure 7:
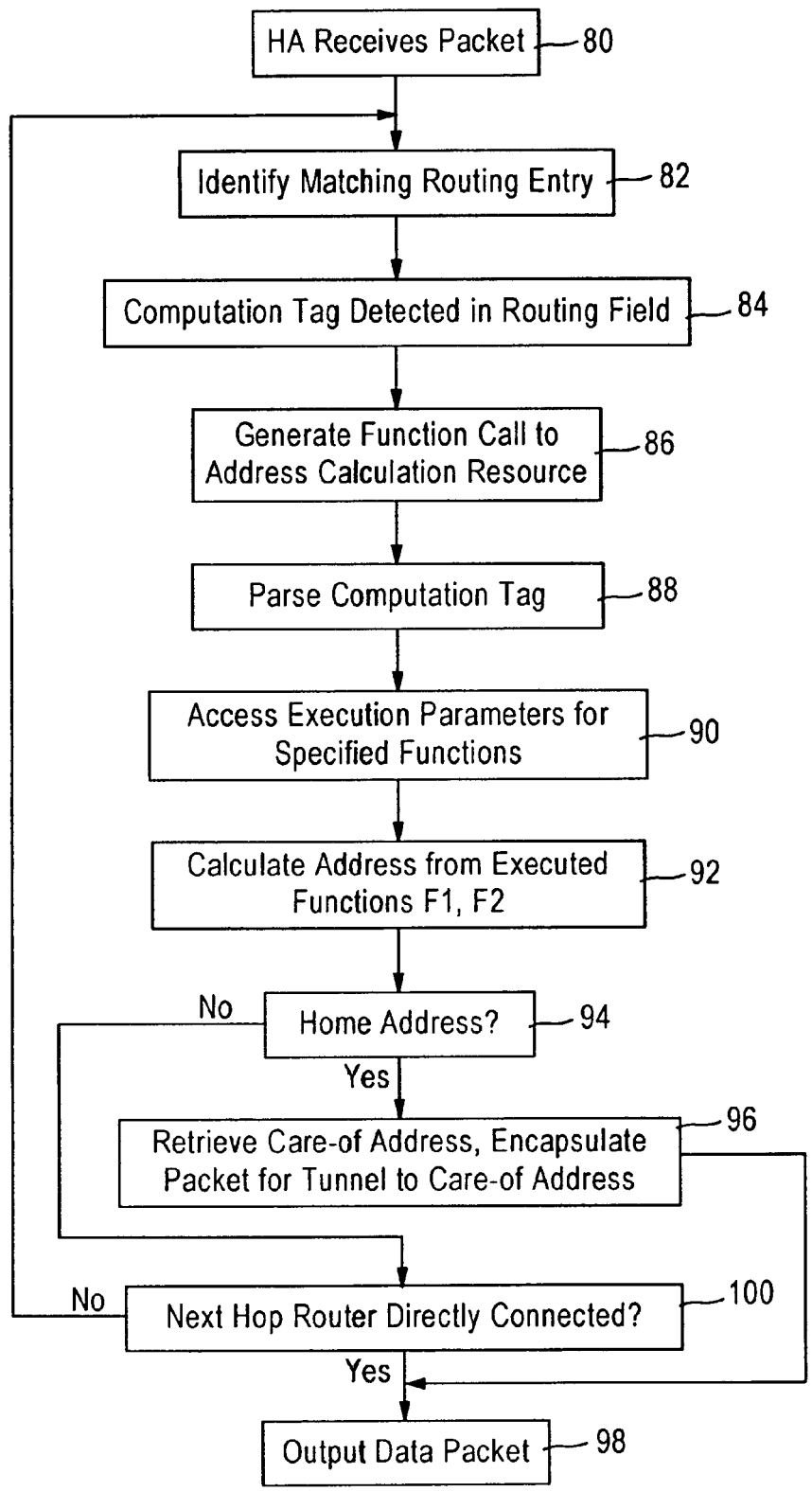
FIG. 7 is a diagram illustrating the method of generating the address for the via router, according to an embodiment of the present invention.

FIG. 7 is a diagram illustrating the method by the home agent 12 of calculating a home address for routing a received packet, according to an embodiment of the present invention. The steps described in FIGS. 2 and 7-9 can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.). Also note that these methods are applicable to the route server 13a and the correspondent router 13b.

The method begins in step 80, where the home agent 12 receives a packet from the correspondent node 24 via the wide area network 10. The key index resource 54 identifies in step 82 a matching routing entry (e.g., 46d) based on the destination address of the received packet (e.g., "DE:AB:0:2::FC0A"). The routing resource 36 detects in step 84 that the corresponding routing field 50 of the matching routing entry 46d specifies a computation tag 52, and in response generates in step 86 a function call to the address calculation resource 56.

The address calculation resource 56 parses the computation tag 52 in step 88, and accesses the relevant parameters from its application runtime environment in step 90, for example the definitions for the functions F1 and F2. The address calculation resource 56 calculates in step 92 the determined address 66 based on execution of the prescribed functions F1 and F2, as illustrated in FIG. 6, and supplies the determined address 66 (e.g., "ABCD::2") to the routing resource 36.

Assuming in step 94 that they determined address 66 specifies a home address for a mobile router 14, the routing resource 36 retrieves in step 96 the corresponding care of address for the mobile router 14c from the binding cache 40, and outputs in step 98 the data packet to the mobile router 14c via its corresponding tunnel 26c.

Assuming in step 94 that the determined address 66 is not for a mobile router, for example in the case where the router 12 is implemented as a generic router, then if in step 100 the determined address does not identify another router directly connected as a next hop to the subject router 12, the routing resource 36 repeats the address lookup, including identifying a matching routing entry, using the determined address as an address key. The repeating of the address lookup is performed in cases where the determined address 66 identifies an intermediate router between the subject router 12 and the destination node, enabling the router 12 to identify the next hop address for forwarding the packet.

Figure 8:
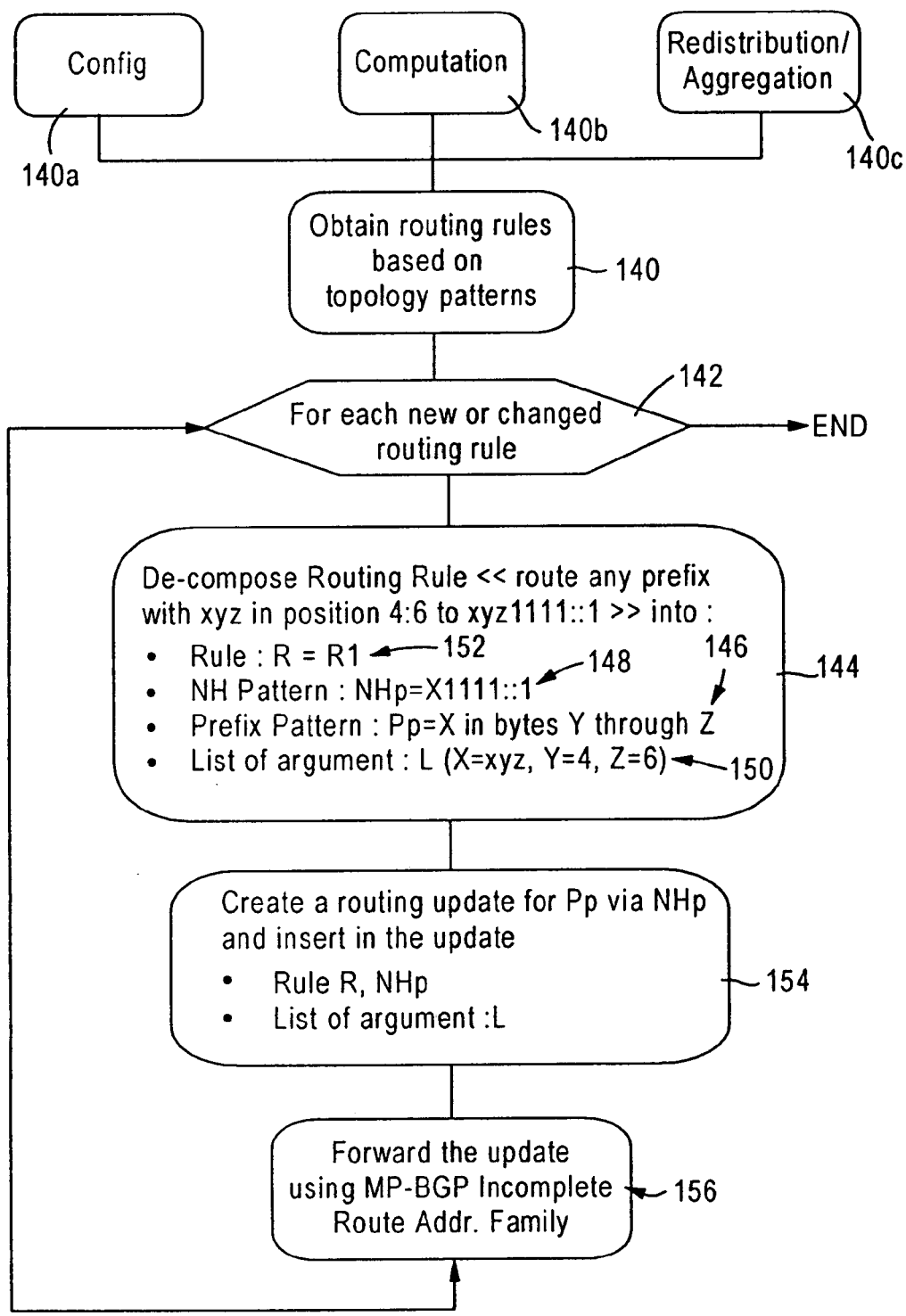
FIG. 8 is a diagram illustrating the method by a router of outputting, to a second router, a routing update message specifying a routing rule for generating an pattern-based automatic route, according to an embodiment of the present invention.

FIG. 8 is a diagram illustrating the method by the home agent 12 (or the route server 306b of FIG. 3) of generating and outputting a routing update message, that describes a routing rule for use by the route server 13a and the correspondent router 13b (or the route server 306a of FIG. 3), according to an embodiment of the present invention. The following description assumes for simplicity that the home agent 13 sends a routing update message directly to the correspondent router 13b to enable the correspondent router 13b to apply the routing rule.

The method begins in step 140, where the routing table 34 stores the routing rules 52 based on obtaining routing rules 52 that specify recognized topology patterns in the aggregated network 16 of FIG. 4. The routing rules 52 may be obtained, for example, by manual configuration in step 140a by a network administrator, based on computation by a network discovery and topology resource in step 140b, or by receiving in step 140c a routing update message from another router according to MP-BGP protocol.

In response to detecting a new or changed routing rule in step 142, the routing protocol resource 57 of FIG. 5 decomposes in step 144 the routing rule 52 into components for transfer in a routing update message. For example, the routing rule "route any prefix with xyz in position 4:6 to xyz1111::1" can be divided into an address prefix pattern rule (Pp) 146, a gateway address pattern rule (also called a Next Hop (NH) Pattern) (NHp) 148, and optionally an argument list 150. The rule also includes a rule identifier 152 (R). Hence, since the routing rule aggregates routes according to a prescribed topology (e.g., as illustrated in FIG. 4), the original routing rule 52 can be reconstructed using the attributes specified by the prefix pattern rule 146, the gateway address pattern rule 148, and the argument list 150. Note the argument list 150 can be omitted if the argument values for X, Y, and Z are specified explicitly in the prefix pattern rule 146 and the gateway address pattern rule 148.

The routing protocol resource 57 creates in step 154 the routing update message for the routing rule "Pp via NHp" by inserting the attributes for the prefix pattern rule 146 and the gateway address pattern rule 148. The routing protocol resource 57 forwards in step 156 the routing update message by specifying an "Incomplete Route" address family, in accordance with MP-BGP protocol, for output by the IP interface 32.

Figure 9:
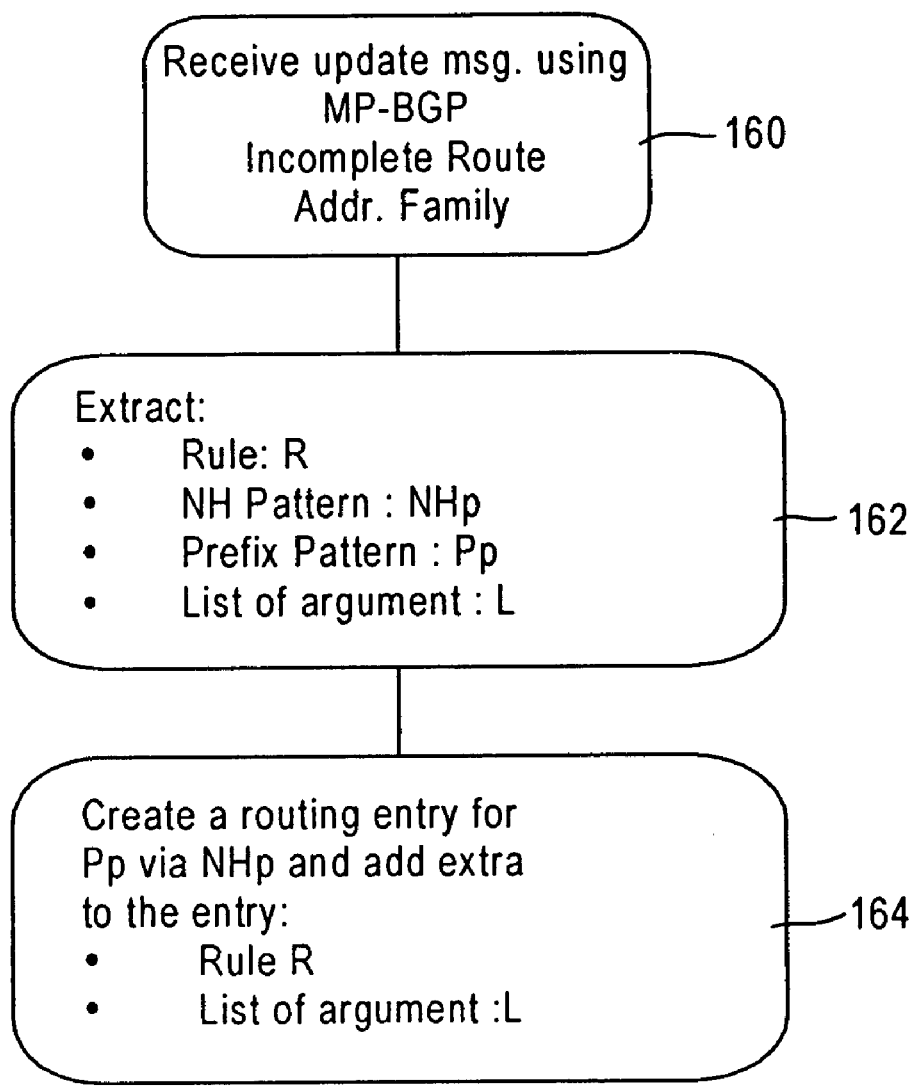
FIG. 9 is a diagram illustrating the method of receiving a routing update message and in response implementing the routing rule for generating the pattern-based automatic route, according to an embodiment of the present invention.

FIG. 9 is a diagram illustrating the reception of the routing update message by the correspondent router 13b or the ingress route server 306a of FIG. 3. The correspondent router 13b receives in step 160 the update message. In response to detecting in step 162 the Incomplete Route address family, the routing protocol resource 57 of the correspondent router 13b extracts the rule, the next hop pattern 148, the prefix pattern 146, and the argument list 150. Note that the routing protocol resource 57 also may regenerate the address prefix pattern rule and the gateway address pattern rule based on prescribed semantics that may be used to interpret the argument list 150; as such, the routing rule may be reconstructed based on applying prescribed semantics to a routing update message that describes the address prefix pattern rule and the gateway address pattern rule solely based on a list of prescribed arguments (i.e., parameters).

The routing protocol resource 57 creates in step 164 a routing entry in the routing table 34 for implementation of the routing rule. Note that the address prefix used as an index key may be obtained separately from the routing update message, based on the prescribed topology of the network and in accordance with route optimization procedures as described in the above-incorporated application Ser. No. 10/361,512.

According to the disclosed embodiment, addresses for next hop routers are determined based on calculating the determined address according to routing rules within a matching routing entry, enabling a via router for a packet to be calculated as the packet is received. Further, the routing rules are distributed to other routers, enabling the effective aggregation of routes to be applied to multiple routers.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an Internet Protocol (IP) based router, the method comprising:

storing in the router a routing rule that defines routes aggregated according to a prescribed topology, the routing rule specifying an address prefix pattern rule for extracting an identified pattern from a first portion of a destination address, and a gateway address pattern rule for generating a gateway address, specifying a gateway providing reachability to the destination address, based on applying the identified pattern to a prescribed function for generation of the gateway address;

generating in the router a routing update message that describes a representation of the address prefix pattern rule and the gateway address pattern rule; and the router outputting the routing update message to a second router according to a prescribed routing protocol, for use by the second router in routing a corresponding received packet according to the prescribed topology.

2. The method of claim 1, wherein the generating step includes:
inserting a gateway field that specifies attributes of the gateway address pattern rule; and
inserting an address prefix field that specifies attributes of the address prefix pattern rule.

3. The method of claim 2, wherein at least one of the gateway field or the address field specify the respective attributes in terms of arguments, the generating step further including inserting an argument list that specifies values for the respective arguments.

4. The method of claim 3, wherein the first portion and the prescribed function identify respective distinct portions of an address.

5. The method of claim 2, wherein the generating step further includes configuring the routing update message as a prescribed reachability message specifying a prescribed address family configured for recognizing the routes according to the rule, the outputting step including outputting the routing update message, according to Multiprotocol Extension for Border Gateway Protocol (MP-BGP), based on determining that the second router recognizes the prescribed address family.

6. The method of claim 1, wherein the outputting includes outputting the routing update message as specifying a prescribed address family, according to Multiprotocol Extension for Border Gateway Protocol (MP-BGP), based on determining that the second router recognizes the prescribed address family and that the routing rule defines the routes aggregated according to the prescribed topology.

7. An Internet Protocol (IP) based router comprising:
a table configured for storing a routing rule that defines routes aggregated according to a prescribed topology, the routing rule specifying an address prefix pattern rule for extracting an identified pattern from a first portion of a destination address, and a gateway address pattern rule for generating a gateway address, specifying a gateway providing reachability to the destination address, based on applying the identified pattern to a prescribed function for generation of the gateway address;
a routing protocol resource configured generating a routing update message, that describes a representation of the address prefix pattern rule and the gateway address pattern rule, for use by a second router in routing a corresponding received packet according to the prescribed topology; and
an IP interface configured for outputting the routing update message to the second router according to a prescribed routing protocol.

8. The router of claim 7, wherein the routing protocol resource is configured for inserting into the routing update message a gateway field that specifies attributes of the gateway address pattern rule, and an address prefix field that specifies attributes of the address prefix pattern rule.

9. The router of claim 8, wherein at least one of the gateway field or the address field specify the respective attributes in terms of arguments, the routing protocol resource configured for inserting into the routing update message an argument list that specifies values for the respective arguments.

10. The router of claim 9, wherein the first portion and the prescribed function identify respective distinct portions of an address.

11. The router of claim 8, wherein the routing protocol resource further is configured for configuring the routing update message as a prescribed reachability message specifying a prescribed address family configured for recognizing the routes according to the rule, routing protocol resource configured for generating the routing update message, according to Multiprotocol Extension for Border Gateway Protocol (MP-BGP), based on determining that the second router recognizes the prescribed address family.

12. The router of claim 7, wherein the routing protocol resource is configured for generating the routing update message as specifying a prescribed address family, according to Multiprotocol Extension for Border Gateway Protocol (MP-BGP), based on determining that the second router recognizes the prescribed address family and that the routing rule defines the routes aggregated according to the prescribed topology.

13. An Internet Protocol (IP) based router comprising:
means for storing a routing rule that defines routes aggregated according to a prescribed topology, the routing rule specifying an address prefix pattern rule for extracting an identified pattern from a first portion of a destination address, and a gateway address pattern rule for generating a gateway address, specifying a gateway providing reachability to the destination address, based on applying the identified pattern to a prescribed function for generation of the gateway address;
means for generating a routing update message that describes a representation of the address prefix pattern rule and the gateway address pattern rule; and
means for outputting the routing update message to a second router according to a prescribed routing protocol, for use by the second router in routing a corresponding received packet according to the prescribed topology.

14. The router of claim 13, wherein the generating means is configured for inserting a gateway field that specifies attributes of the gateway address pattern rule, and inserting an address prefix field that specifies attributes of the address prefix pattern rule.

15. The router of claim 14, wherein at least one of the gateway field or the address field specify the respective attributes in terms of arguments, the generating means configured for inserting an argument list that specifies values for the respective arguments.

16. The router of claim 15, wherein the first portion and the prescribed function identify respective distinct portions of an address.

17. The router of claim 14, wherein the generating means is configured for configuring the routing update message as a prescribed reachability message specifying a prescribed address family configured for recognizing the routes according to the rule, the generating means configured for generating the routing update message, according to Multiprotocol Extension for Border Gateway Protocol (MP-BGP), based on determining that the second router recognizes the prescribed address family.

18. The router of claim 13, wherein the generating means is configured for specifying within the routing update message a prescribed address family, according to Multiprotocol Extension for Border Gateway Protocol (MP-BGP), based on determining that the second router recognizes the prescribed address family and that the routing rule defines the routes aggregated according to the prescribed topology.

19. The method of claim 1, wherein the outputting includes outputting the routing update message to the second router according to the prescribed routing protocol, for implementation of the routing rule by the second router in routing the corresponding received packet according to the prescribed topology.

20. The router of claim 7, wherein the IP interface outputs the routing update message to the second router according to the prescribed routing protocol for implementation of the routing rule by the second router in routing the corresponding received packet according to the prescribed topology.

21. The router of claim 13, wherein the means for outputting outputs the routing update message to the second router according to the prescribed routing protocol for implementation of the routing rule by the second router in routing the corresponding received packet according to the prescribed topology.

22. The method of claim 1, wherein:

the gateway is implemented as a gateway router;

the destination address is for a destination node reachable via the gateway router; and the gateway address and the destination address are distinct IPv6 addresses.

23. The method of claim 1, wherein the gateway address pattern rule is for calculating the gateway address based on inserting the identified pattern into the specified second portion of the gateway address.

24. The router of claim 7, wherein:

the gateway is implemented as a gateway router;

the destination address is for a destination node reachable via the gateway router; and the gateway address and the destination address are distinct IPv6 addresses.

25. The router of claim 7, wherein the gateway address pattern rule is for calculating the gateway address based on inserting the identified pattern into the specified second portion of the gateway address.

26. The router of claim 13, wherein:

the gateway is implemented as a gateway router;

the destination address is for a destination node reachable via the gateway router; and the gateway address and the destination address are distinct IPv6 addresses.

27. The router of claim 13, wherein the gateway address pattern rule is for calculating the gateway address based on inserting the identified pattern into the specified second portion of the gateway address.

* * * * *